(12) United States Patent
Thompson et al.

(10) Patent No.: US 6,671,703 B2
(45) Date of Patent: Dec. 30, 2003

(54) SYSTEM AND METHOD FOR FILE TRANSMISSION USING FILE DIFFERENTIATION

(75) Inventors: Peter F. Thompson, Flagstaff, AZ (US); Kevin M. Peterson, Roswell, GA (US); Said Mohammadioun, Atlanta, GA (US)

(73) Assignee: Synchrologic, Inc., Alpharetta, GA (US)

(*) Notice: Subject to any disclaimer, the term of this patent is extended or adjusted under 35 U.S.C. 154(b) by 216 days.

(21) Appl. No.: 09/887,840

(22) Filed: Jun. 22, 2001

(65) Prior Publication Data

US 2002/0038314 A1 Mar. 28, 2002

Related U.S. Application Data

(60) Provisional application No. 60/213,502, filed on Jun. 22, 2000.

(51) Int. Cl.[7] .............................................. G06F 17/30
(52) U.S. Cl. ..................... 707/202; 707/2; 707/101; 707/204; 709/217
(58) Field of Search ............................. 707/201, 203, 707/204, 2, 5, 6, 10, 101, 202; 709/217, 218; 341/51

(56) References Cited

U.S. PATENT DOCUMENTS

| | | | |
|---|---|---|---|
| 5,446,888 A | 8/1995 | Pyne | 395/600 |
| 5,706,510 A | 1/1998 | Burgoon | 395/619 |
| 5,822,511 A * | 10/1998 | Kashyap et al. | 714/8 |
| 5,832,520 A | 11/1998 | Miller | 707/203 |
| 5,919,247 A * | 7/1999 | Van Hoff et al. | 709/217 |
| 5,990,810 A * | 11/1999 | Williams | 341/51 |
| 6,026,390 A * | 2/2000 | Ross et al. | 707/2 |
| 6,158,019 A | 12/2000 | Squibb | 714/13 |
| 6,513,050 B1 * | 1/2003 | Williams et al. | 707/202 |

FOREIGN PATENT DOCUMENTS

| | | | | |
|---|---|---|---|---|
| CA | 2255047 A1 * | 5/2000 | | G06F/7/20 |
| WO | WO 9625801 A1 * | 8/1996 | | H03M/7/30 |

* cited by examiner

Primary Examiner—Shahid Al Alam
(74) Attorney, Agent, or Firm—Smith, Gambrell & Russell, LLP

(57) ABSTRACT

The present invention provides a system and method for efficiently transferring files using file differentiation. In architecture, the system includes a client device with a device file, a server device containing an original file and a revision file of the original file, and a delta file that identifies only the changes between the original file and the revision file. The present invention can also be viewed as a method for efficiently transferring files using file differentiation. The method operates by (1) providing an original file; (2) creating a revision file of the original file; and (3) generating a delta file that identifies only the changes between the original file and the revision file.

21 Claims, 7 Drawing Sheets

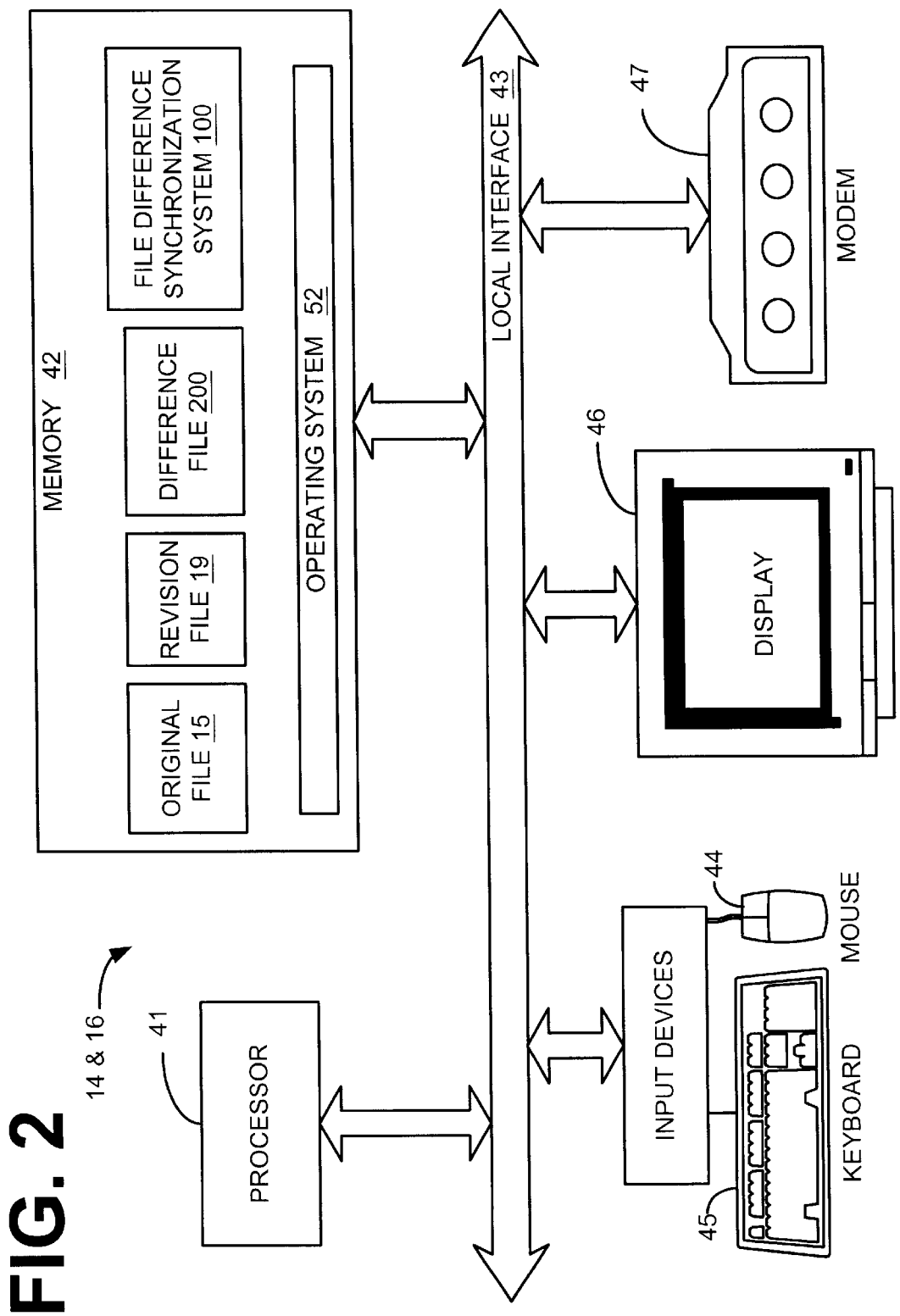

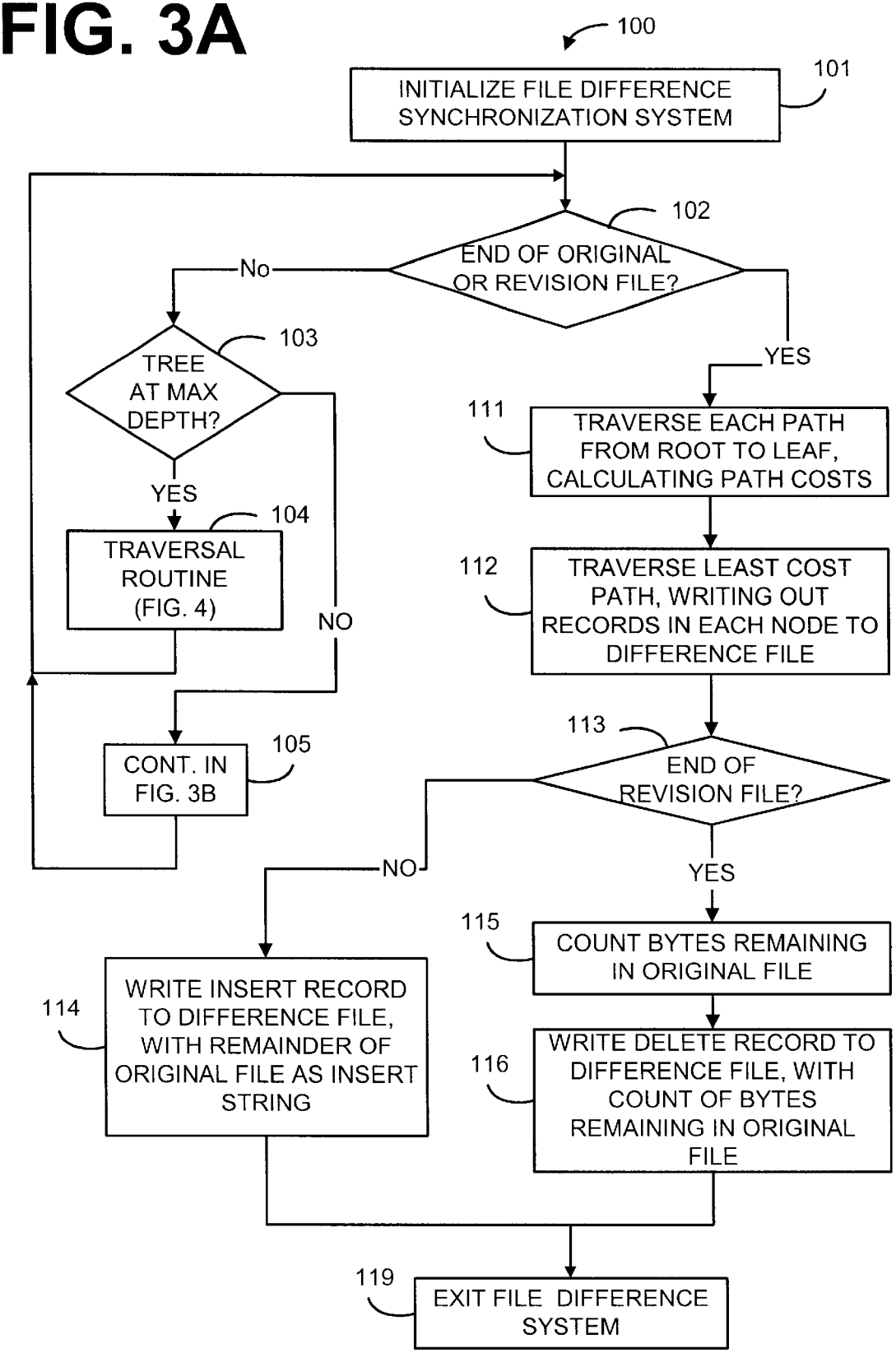

US 6,671,703 B2

SYSTEM AND METHOD FOR FILE TRANSMISSION USING FILE DIFFERENTIATION

CROSS-REFERENCE TO RELATED APPLICATIONS

This application claims the benefit of U.S. Provisional Patent Application Ser. No. 60/213,502, filed on Jun. 22, 2000, and entitled "DELTAMAN", which is incorporated by reference herein in its entirety.

FIELD OF THE INVENTION

The present invention relates to a method and system for updating files, and more particularly, relates to a method and system for efficiently synchronizing remote files using file differentiation.

BACKGROUND OF THE INVENTION

In many business environments, a server is used to store data that is pertinent to many employees or remote users of a business. The server is typically accessible by remote computer systems ("clients") to increase the availability of information to the remote users. By providing files on a server, which may be accessed by remote computer systems, dissemination of information through the company is increased. Remote access to a file is more critical in environments where a sales force or many employees operate away from the office. As an example, the remote employees rely on the information contained within the file to be informed about inventory changes, pricing data, and company events. Rather than remain connected to the server indefinitely and collect telecommunication charges or tie up phone lines, the remote users only intermittently connect their computers to a server for access to the files on the server. In these environments, the remote computer systems typically store the server file locally to support the remote application even when the client is not connected to the server. The intermittent connection is then used to send only changes made by the client application to the server and a pertinent set of changes from the server to the client. This type of remote computer system environment is called an Intermittently Connected (IC) environment. ICs have a wide variety of applications in sales force automation, insurance claim processing, and mobile work forces in general anywhere there are mobile users.

An important communication issue for this type of computer environment is the timely and efficient exchange of information between the clients and the server. The term "file transfer" is often used to describe the process of maintaining data consistency and integrity among server files and client files. There are many synchronization schemes for maintaining consistency. In some known file transfer schemes, various protocols and methods, for example compression to efficiently transfer files, are used.

Thus, heretofore an unaddressed need exists in the industry to address the aforementioned deficiencies in downloading files to a system quickly and efficiently.

SUMMARY OF THE INVENTION

The invention provides a system and method for efficiently transferring files using file differentiation. The invention may be conceptualized as a file differentiation system that includes a client device with a device file, a server device containing an original file and a revision file of the original file, and a delta file that identifies only the changes between the original file and the revision file.

The invention may also be conceptualized as a method for efficiently transferring files using file differentiation, the method comprising the steps of: (1) providing an original file; (2) creating a revision file of the original file; and (3) generating a delta file that identifies only the changes between the original file and the revision file.

BRIEF DESCRIPTION OF THE DRAWINGS

The present invention, as defined in the claims, can be better understood with reference to the following drawings. The components within the drawings are not necessarily to scale relative to each other, emphasis instead being placed upon clearly illustrating the principles of the present invention.

FIG. 2 is a block diagram illustrating an example of a computer system utilizing the file difference synchronization system 100 of the present invention.

FIGS. 3A and 3B are flow charts collectively illustrating an example of the process flow of the file difference synchronization system 100 of the present invention, as shown in FIG. 2.

DETAILED DESCRIPTION OF THE INVENTION

The invention to be described hereafter is applicable to all file transfer systems using a file differentiation system in the present invention to maintain remote file synchronization. While described below with respect to a single computer, the system and method for a file difference synchronization system 100 is typically implemented in a networked computing arrangement in which a number of computing devices communicate over a local area network (LAN), over a wide area network (WAN), or over a combination of both LAN and WAN.

Figure 1:
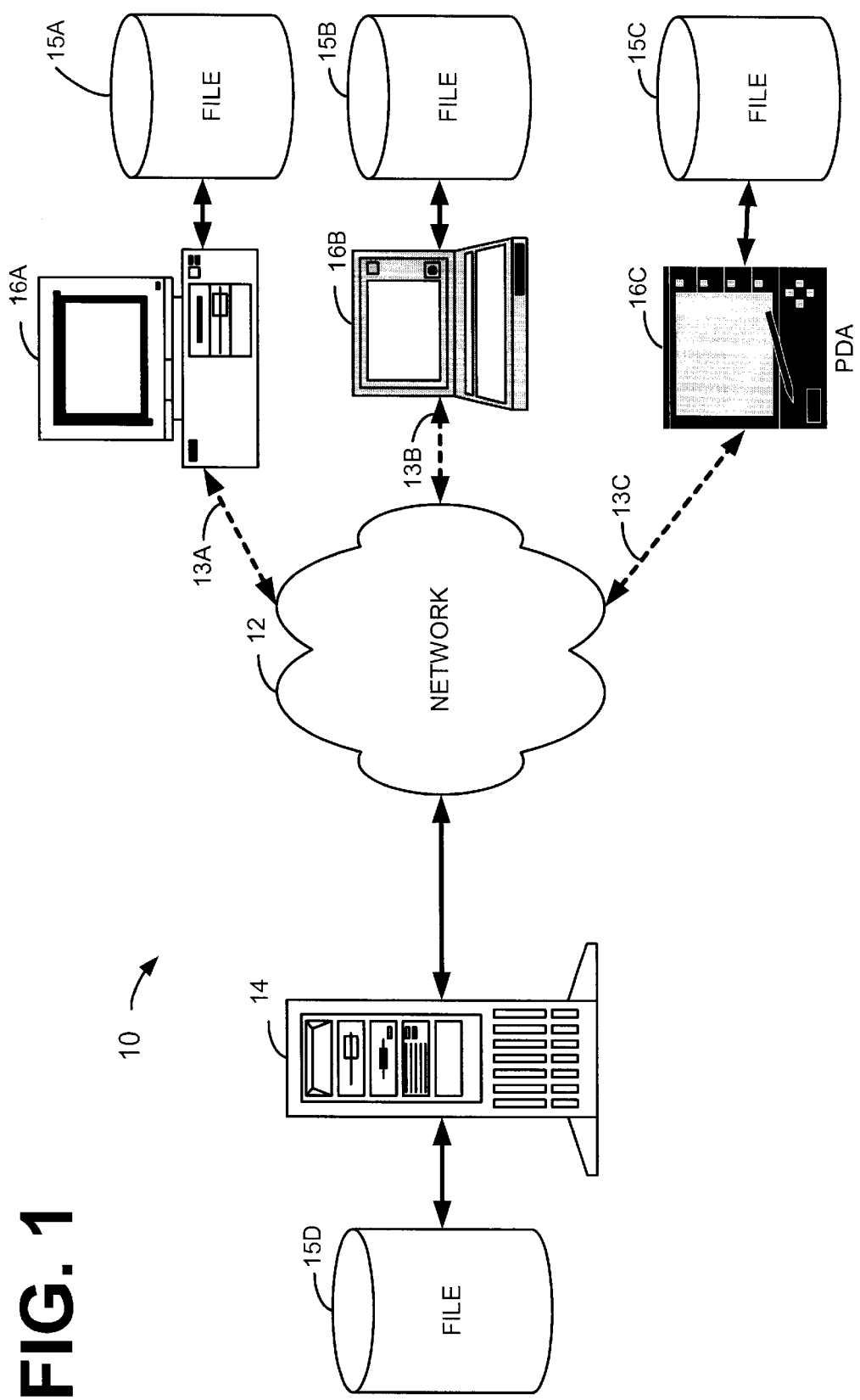
FIG. 1 is a block diagram illustrating the network environment in which a computing device including the file difference synchronization system 100 of the present invention.

Referring now to the drawings, in which like numerals illustrate like elements throughout the several views, FIG. 1 illustrates the basic components of an intermittent connected file transfer system ("ICFT") 10 used in connection with the preferred embodiment of the present invention. The system 10 includes client systems 16a, 16b, and 16c. Each client has applications and a local file 15a, 15b, and 15c. A computer server 14 contains applications and a server file 15d that are accessed by client systems 16(a–c) via intermittent connections 13(a–c), respectively, over network 12. The server 14 runs administrative software for a computer network and controls access to part or all of the network and its devices. The client systems 16(a–c) share the server data stored at the computer server 14 and may access the server 14 over a network 12, such as but not limited to: the Internet, a local area network (LAN), a wide area network (WAN), via a telephone line using a modem or other like networks. The server 14 may also be connected to the local area network (LAN) within an organization.

The structure and operation of the ICFT system 10 enables the server 14 and the server file 15d associated therewith to handle clients more efficiently than previously known systems. Particularly, the present invention provides a manner of organizing data of the server file into updates that enable a remote client system to update its remote file more efficiently. Periodically, a modification ("delta" or "update") file is created for each client with all relevant changes since the last modification file creation. When the clients systems 16(a–c) connect to the server 14, the modification files associated with the client are transmitted to the client to be used for updating each client's individual files.

The client systems 16a–16c may each be located at remote sites. Thus, when a user at one of the remote client systems 16(a–c) desires to be updated with the current information from the shared file at the server 14, the client system 16(a–c) communicates over the network 12, such as but not limited to WAN, internet, or telephone lines to access the server 14. Advantageously, the present invention provides a system and method for updating client systems to most efficiently transfer their remote files with the file ISD on the server 14. Periodically, the server determines the data that has changed for each client since the last evaluation, and records those changes in a modification file. When a client connects to the server, it requests the modification files for the client, creates the downloaded modification files, and updates its local file.

Hence, the present invention provides for a more efficient approach to maintaining synchronization of remote client files. In this approach, the server 14, compares an original file with a revision of the file, and generates a delta modification file which describes the changes that need to be made to the original file to create the revised file on the client 16. This delta or modification file has been transmitted to the remote user, where the changes, as described in the delta modification file, will be applied to the remote users copy of the original file to create the revised file.

Generally, the file difference synchronization method will go along comparing bytes in both files, as long as they match, the count is increased, which will be the amount for a skip record. When there is a mismatch, a token's worth of bytes at the mismatch point is grabbed from both the original file and revision file. With the token from the original file, there is an attempt to find that token in the revision file. If the matching token is found, it is called a "sync" and there is an assumption that there was an insert. Likewise, with the token from the revision file there is an attempt to find it in the original file. If a match is found, it is called a "sync" and there is an assumption that there has been a delete. If neither is found, then it is assumed that there was a replace of one byte, advance both file pointers, grab tokens from both files and continue to look for a sync point.

The method for merging the delta with the original file on the client system 16 (A–C) will read a record from the delta, and then will do one of the three things: (1) copy bytes from the original file to the new (an unchanged region); (2) skip over bytes in the original file, not copying them (a deletion in the original); or (3) copy bytes from the deltas to the new revised file (and insert into the original insert).

The delta modification file will be made up of records, each having a type, followed by a length and some having data following. There are four types of records:

(1) skip—indicating a match region, no data follows; (2) delete—indicates a portion of the original that needs to be deleted, no data follows; (3) insert—inserts bytes into the original, the data to be inserted follows; or (4) replace—a combination of delete and insert.

For example, consider the following two strings.
ABCDEFGHI and ABCxxxDE
If we consider the first to be the original and the second to be the revision, the delta would be:

| | |
|---|---|
| SKIP 3 | Copy the ABC from original to revision |
| INSERT 3 xxx | Add xxx to the revision |
| SKIP 2 | Copy DE from the original to the revision |
| DELETE 4 | Don't copy FGHI |

Generally, in terms of hardware architecture, as shown in FIG. 2, the computers 14 & 16 include a processor 41, storage 42 memory 42, and one or more input and/or output (I/O) devices (or peripherals) that are communicatively coupled via a local interface 43. The local interface 43 can be, for example but not limited to, one or more buses or other wired or wireless connections, as is known in the art. The local interface 43 may have additional elements, which are omitted for simplicity, such as controllers, buffers (caches), drivers, repeaters, and receivers, to enable communications. Further, the local interface 43 may include address, control, and/or data connections to enable appropriate communications among the aforementioned components.

The processor 41 is a hardware device for executing software that can be stored in memory 42. The processor 41 can be virtually any custom made or commercially available processor, a central processing unit (CPU) or an auxiliary processor among several processors associated with the computer 14 & 16, and a semiconductor based microprocessor (in the form of a microchip) or a macroprocessor. Examples of suitable commercially available microprocessors are as follows: an 80×86 or Pentium series microprocessor from Intel Corporation, U.S.A., a PowerPC microprocessor from IBM, U.S.A., a Sparc microprocessor from Sun Microsystems, Inc, a PA-RISC series microprocessor from Hewlett-Packard Company, U.S.A., or a 68xxx series microprocessor from Motorola Corporation, U.S.A.

The memory 42 can include any one or combination of volatile memory elements (e.g., random access memory (RAM, such as dynamic random access memory (DRAM), static random access memory (SRAM), etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 42 may incorporate electronic, magnetic, optical, and/or other types of storage media. Note that the memory 42 can have a distributed architecture, where various components are situated remote from one another, but can be accessed by the processor 41. File 15 resides in memory 42.

The software in memory 42 may include one or more separate programs, each of which comprises an ordered listing of executable instructions for implementing logical functions. In the example of FIG. 2, the software in the memory 42 includes a suitable operating system (O/S) 52 and the file difference synchronization system 100 of the present invention.

A non-exhaustive list of examples of suitable commercially available operating systems 52 is as follows: a Windows operating system from Microsoft Corporation, U.S.A., a Netware operating system available from Novell, Inc., U.S.A., an operating system available from IBM, Inc., U.S.A., any LINUX operating system available from many vendors or a UNIX operating system, which is available for purchase from many vendors, such as Hewlett-Packard Company, U.S.A., Sun Microsystems, Inc. and AT&T Corporation, U.S.A. The operating system 52 essentially controls the execution of other computer programs, such as the file difference synchronization system 100, and provides scheduling, input-output control, file and data management, memory management, and communication control and related services. However, it is contemplated by the inventors that the file difference synchronization system 100 of the present invention is applicable on all other commercially available operating systems.

The file difference synchronization system 100 may be a source program, executable program (object code), script, or any other entity comprising a set of instructions to be performed. When a source program, then the program is usually translated via a compiler, assembler, interpreter, or the like, which may or may not be included within the memory 42, so as to operate properly in connection with the O/S 52. Furthermore, the file difference synchronization system 100 can be written as (a) an object oriented programming language, which has classes of data and methods, or (b) a procedure programming language, which has routines, subroutines, and/or functions, for example but not limited to, C, C++, Pascal, BASIC, FORTRAN, COBOL, Perl, Java, and Ada.

The I/O devices may include input devices, for example but not limited to, a keyboard 45, mouse 44, scanner (not shown), microphone (not shown), etc. Furthermore, the I/O devices may also include output devices, for example but not limited to, a printer (not shown), display 46, etc. Finally, the I/O devices may further include devices that communicate both inputs and outputs, for instance but not limited to, a NIC or modulator/demodulator 47 (for accessing other files, devices, systems, or a network), a radio frequency (RF) or other transceiver (not shown), a telephonic interface (not shown), a bridge (not shown), a router (not shown), etc.

If the computer 14 & 16, is a PC, workstation, or the like, the software in the memory 42 may further include a basic input output system (BIOS) (omitted for simplicity). The BIOS is a set of essential software routines that initialize and test hardware at startup, start the O/S 52, and support the transfer of data among the hardware devices. The BIOS is stored in ROM so that the BIOS can be executed when the computer 14 & 16 is activated.

When the computer 14 & 16 is in operation, the processor 41 is configured to execute software stored within the memory 42, to communicate data to and from the memory 42, and to generally control operations of the computer 14 & 16 pursuant to the software. The file difference synchronization system 100 and the O/S 52 are read, in whole or in part, by the processor 41, perhaps buffered within the processor 41, and then executed.

When the file difference synchronization system 100 is implemented in software, as is shown in FIG. 2, it should be noted that the file difference synchronization system 100 can be stored on virtually any computer readable medium for use by or in connection with any computer related system or method. In the context of this document, a computer readable medium is an electronic, magnetic, optical, or other physical device or means that can contain or store a computer program for use by or in connection with a computer related system or method. The file difference synchronization system 100 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the file difference synchronization system 100 is implemented in hardware, the file difference synchronization system 100 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 3B:
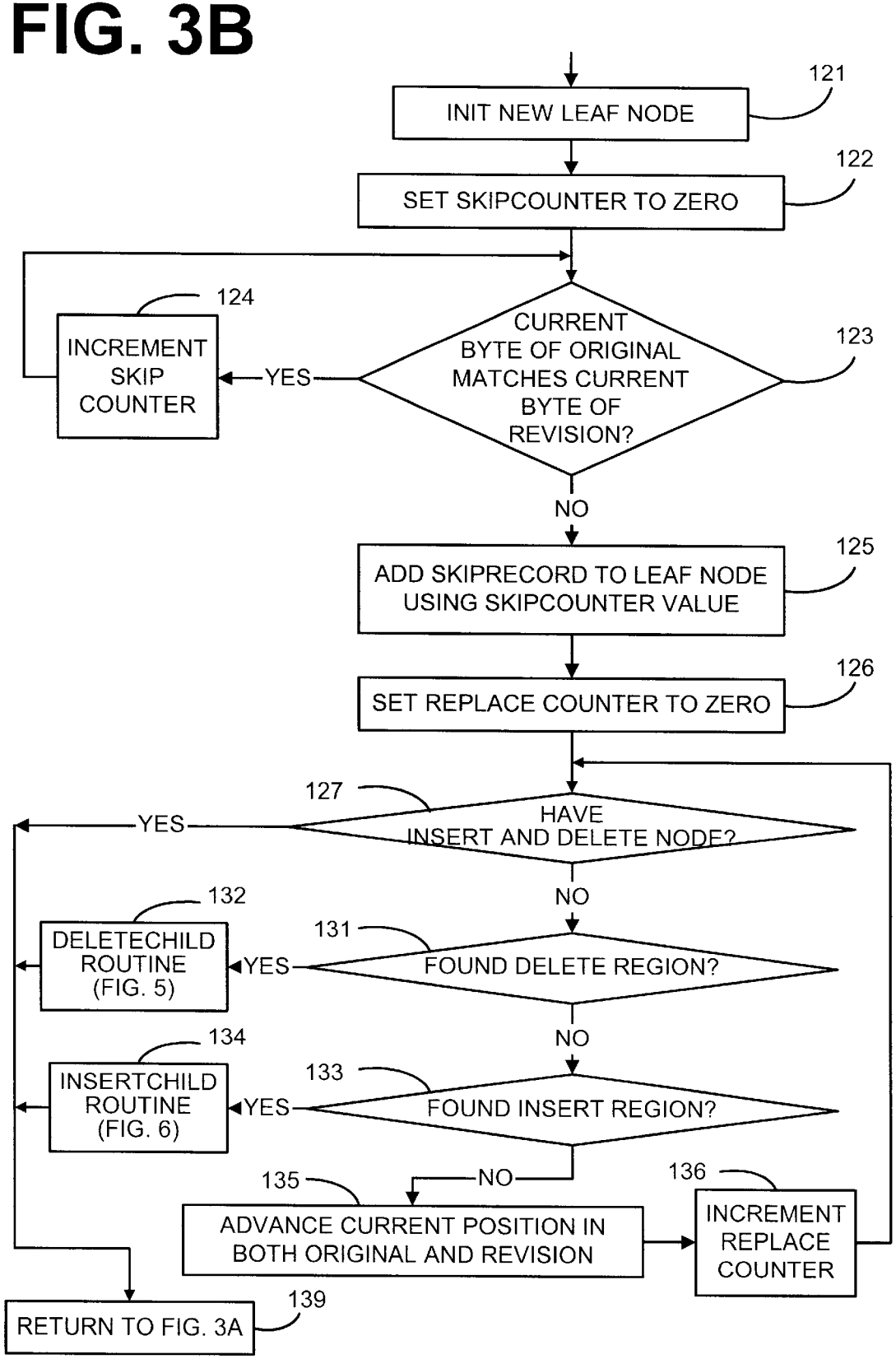

Illustrated in FIGS. 3A and 3B are flow charts collectively depicting an example of the process flow of the file difference synchronization system 100 of the present invention, as shown in FIG. 2. It is in the First at step 101, the file difference synchronization system 100 is initialized. Next at step 102, the file difference synchronization system 100 determines if the original file 15 or the revision file 19 have either reached an end of file status (EOF). If it is determined at step 102 that neither the original file 15 or revision file 19 have reached an end of file (EOF) status, then the file difference synchronization system 100 proceeds to step 103 to determine if the difference tree is at a max depth.

If it is determined at step 103 that the difference tree is at a max depth, then the file difference synchronization system 100 performs the traversal routine at step 104. The traversal routine is herein defined in further detail with regard to FIG. 4. After performing the traversal routine at step 104, the file difference synchronization system 100 then returns to repeat step 102. However, if it is determined at step 103 that the difference tree is at a max depth, then the file difference synchronization system 100 then proceeds for further processing at step 121 with regard to FIG. 3B.

At step 121 (FIG. 3B), the file difference synchronization system 100 initiates a new leaf node and then sets a skipcounter to zero at step 122. At step 123 the file difference synchronization system 100 then determines if the current byte of the original file 15 matches a current byte of the revision file 19. If it is determined at step 123 that the current byte of the original file 15 matches the current byte of the revision file 15, then the file difference synchronization system 100 increments the skipcounter at step 124 and returns to repeat step 123. This situation occurs as long as the data in the original file 15 and revision file 19 match. However, if it is determined at step 123 that the current byte of the original file 15 does not match the current byte of the revision file 19, then the file difference synchronization system 100 adds a skiprecord to the leaf node using the current skipcounter value at step 125. This situation occurs as long as the data in the original file 15 and revision file 19 do not match. At step 126, the file difference synchronization system 100 then sets the replace counter to zero.

At step 127 the file difference synchronization system 100 determines if the original file 15 and revision file 19 are synced for an insertion and deletion. In order to determine if an insertion and deletion has taken place when a mismatch occurs in the comparison of the original file 15 and revision file 19, scanning is preformed in both the original file 15 and revision file 19 to search for the next common block of data. If a data segment of the original file 15 is found when scanning forward in the revision file 19, it is assumed that an insertion has occurred. In addition, if a data segment of the revision file 19 is found when scanning forward in the original file 15, it is assumed that a deletion has occurred.

If it is determined at step 127 that the original file 15 and revision file 19 are synced for an insertion and deletion, then the file difference synchronization system 100 then returns to step FIG. 3A. The original file 15 and revision file 19 are synced when the binary tree has created both a delete node and an insertion node. However, if it is determined at step 127 that the original file 15 and revision file 19 are not synced for an insertion and deletion, the file difference synchronization system 100 then determines if the token is matched for a deletion at step 131. The original file 15 and revision file 19 are not synced when the binary tree has created only a delete node or an insertion node. If it is determined at step 131 that the original file 15 and revision file 19 are matched for deletion, then the file difference synchronization system 100 then performs the deletechild routine at step 132. The deletechild routine is herein described in further detail with regard to FIG. 5. After performing the deletechild routine at step 132, the file difference synchronization system 100 then proceeds to step 139 and returns to FIG. 3A.

However, if it is determined at step 131 that the original file 15 and revision file 19 are not matched for deletion, then the file difference synchronization system 100 then determines if the token is matched for an insertion at step 133. If it is determined at step 133 that the token is matched for insertion, the file difference synchronization system 100 then performs the insertchild routine at step 134. The insertchild routine is herein defined in further detail with regard to FIG. 6. After performing the insertchild routine at step 134, the file difference synchronization system 100 returns to FIG. 3A.

Notwithstanding, if it is determined at step 133 that the tokens are not matched for an insertion, then the file difference synchronization system 100 advances a current position in both the original file 15 and revision file 191 at step 135. At step 136 the file difference synchronization system 100 increments the replacement counter and returns to repeat steps 127 through 136. After completing further processing the file difference synchronization system 100 then returns to FIG. 3A to repeat step 102.

If however, it is determined at step 102 that either the original file 15 or revision file 19 has incurred an end of file status (EOF), then the file difference synchronization system 100 calculates the path cost at step 111. The path cost is calculated by traversing each path from root to leaf. The path cost is based upon the size of the delta that would be generated. At step 112, the file difference synchronization system 100 traverses the least cost path (i.e., the path with the smallest delta) writing out records in each node to the difference file 200.

At step 113, the file difference synchronization system 100 then determines if the end of file (EOF) status has been reached for the revision file 19 (FIG. 2). If it is determined at step 113 that the end of file (EOF) status for the revision file has not occurred, the file difference synchronization system 100 then writes the insert record to the difference file 200 (FIG. 2) with a remainder of the original file 15 as an insert string at step 114. After writing the insert record at step 114, the file difference synchronization system 100 then exits at step 119.

However, if it is determined at step 113 that the end of file (EOF) status for the revision file 19 has occurred, then the file difference synchronization system 100 then counts the bytes remaining in the original file at step 115. At step 116, the file difference synchronization system 100 writes a delete record to the difference file 200 with the count of the bytes remaining in the original file at step 116. The file difference synchronization system 100 then exits at step 119.

Figure 4:
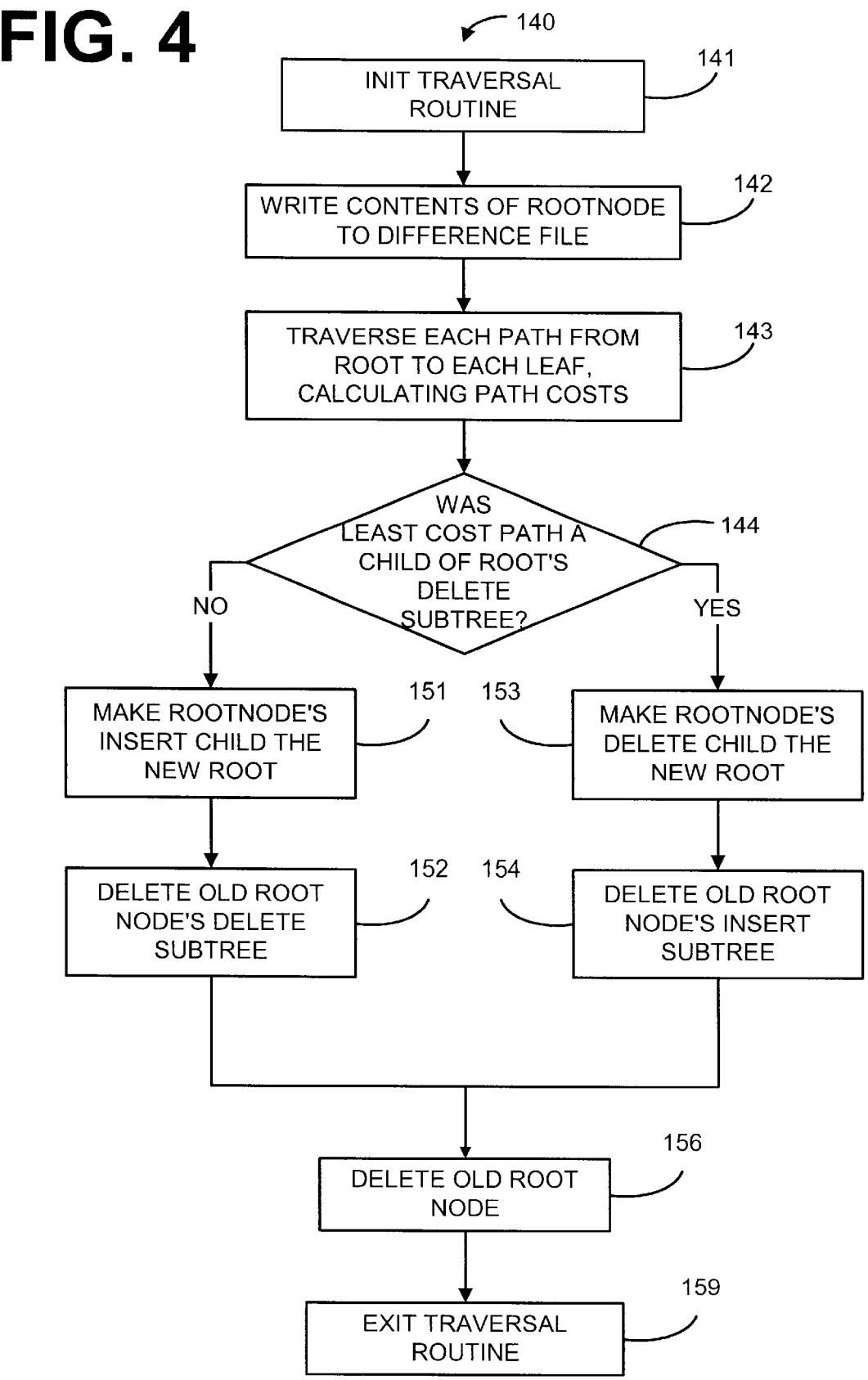
FIG. 4 is a flow chart illustrating an example of traversal routine, as shown in FIG. 3A, operating with the file difference synchronization system 100 of the present invention.

Illustrated in FIG. 4 is a flow chart illustrating an example of traversal routine 140, as shown in FIG. 3A, operating with the file difference synchronization system 100 (FIGS. 3A and 3B) of the present invention. The traversal routine picks a tree depth, and once reached, writes the root node to the delta, finds the best path from root to leaf node, and then throws away (i.e. prunes) the root plus the other half of the tree (promoting either the pRoot->delete or pRoot->insert to pRoot), and goes again. This way the tree is kept at a specified depth, thus keeping memory allocation to a known amount, as well as keeping down the amount of time spent scanning.

First, the traversal routine 140 is initialized at step 141. At step 142 the traversal routine 140 writes the contents of the root node to the difference file 200 (FIG. 2). Next at step 143, the traversal routine 140 traverses each path from the root to each leaf calculating the path costs of each traversal.

At step 144, the traverse routine 140 determines if the least cost path was a child of a root's delete subtree. If it is determined at step 144 that the least cost path was not a child of a root delete subtree then the traversal routine 140 makes the root node's insert child into the new root at step 151. At step 152, the traversal routine 140 deletes the old root node's delete subtree and then proceeds to step 156. However, if it is determined at step 144 that the least cost path was a child of a root's delete subtree, then the traversal routine 140 makes the root node's delete child the new root at step 153. At step 154, the traversal routine 140 deletes the old root node's insert subtree. At step 156 the traversal routine 140 then deletes the old root node and exits the traversal routine at step 159.

Figure 5:
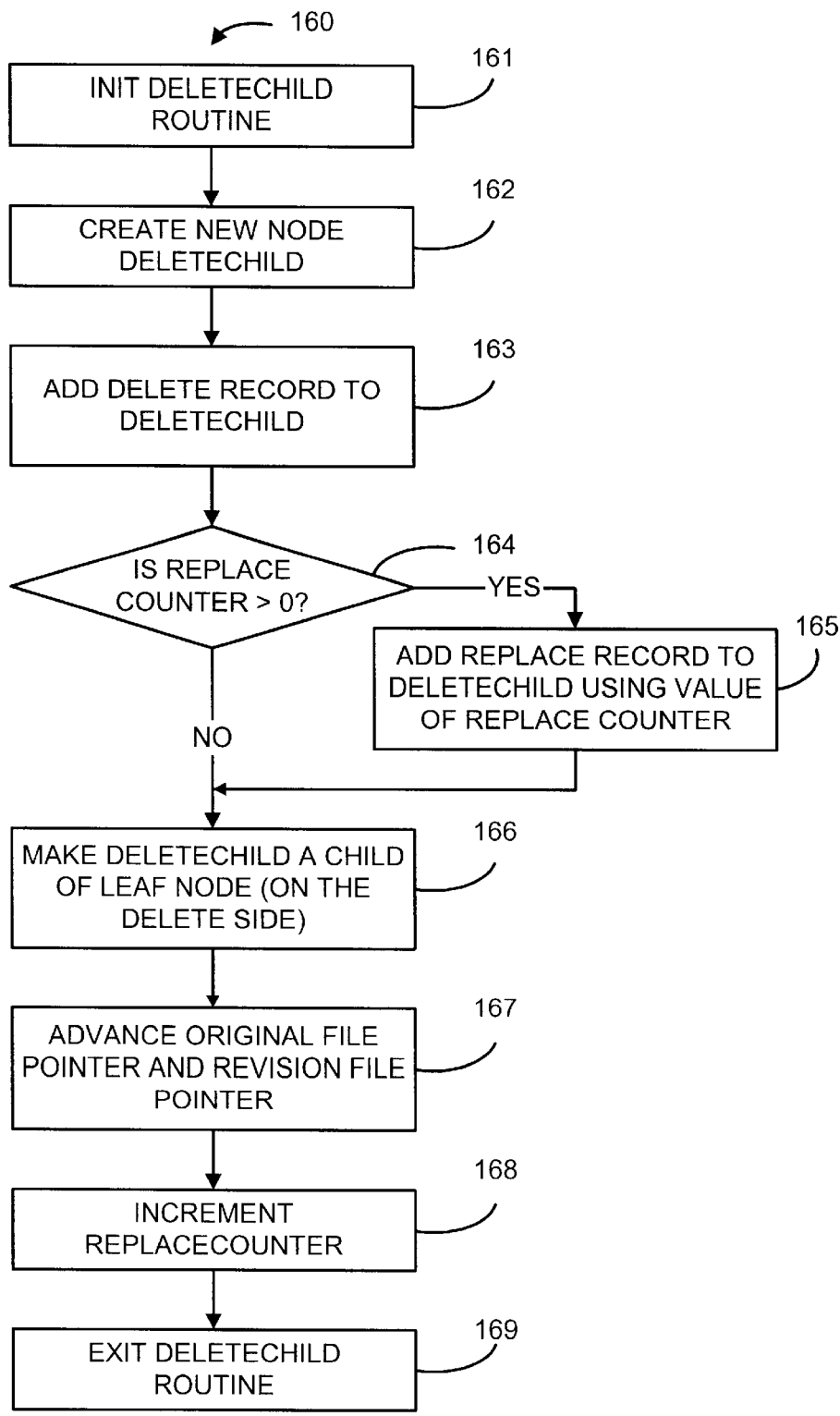
FIG. 5 is a flow chart illustrating an example of deletechild routine, as shown in FIG. 3B, operating with the file difference synchronization system 100 of the present invention.

Illustrated in FIG. 5 is a flowchart illustrating an example of the deletechild routine 160, as shown in FIG. 3B, operating with the file difference synchronization system 100 (FIGS. 3A and 3B) of the present invention. First the deletechild routine 160 is initialized at step 161. At step 162, the deletechild routine 160 creates a new node deletechild. The deletechild routine 160 then adds the delete record to the deletechild at step 163. At step 164, the deletechild routine 160 determines if the replace counter is greater than zero. If it is determined at step 164 that the replace counter is not greater than zero, the deletechild routine 160 then proceeds to step 166. However, if it is determined at step 166 that the replace counter is greater than zero, then the deletechild routine 160 adds the replace record to the deletechild using the value of the replace counter at step 165.

At step 166, the deletechild routine 160 makes a deletechild a child of the leaf node on the delete side, and advances the pointer to the original file 15 and the pointer to the revision file 19 at step 167. At step 168, the deletechild routine increments the replace counter and exits at step 169.

Figure 6:
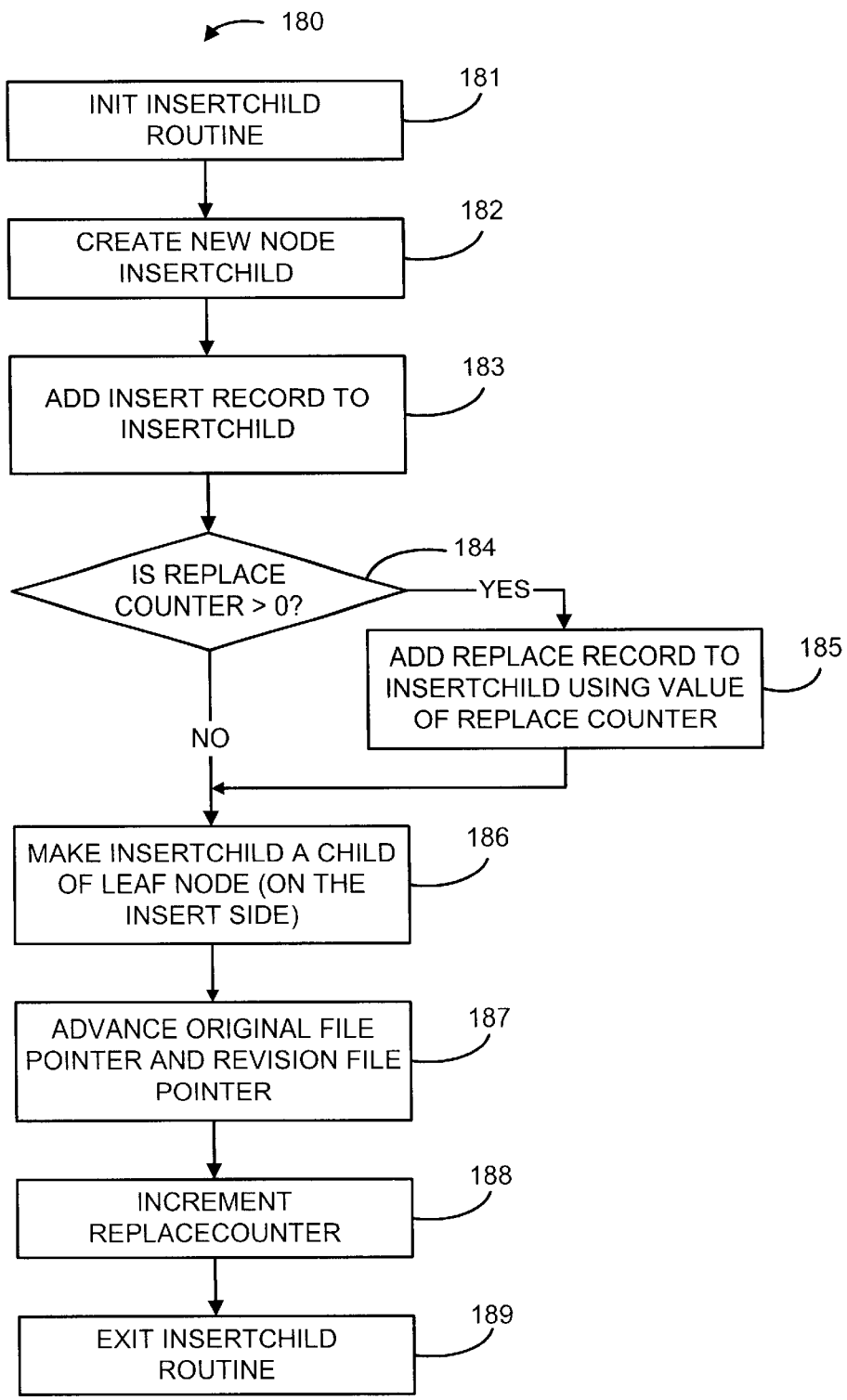
FIG. 6 is a flow chart illustrating an example of insertchild routine, as shown in FIG. 3B, operating with the file difference synchronization system 100 of the present invention.

Illustrated in FIG. 6 is a flowchart illustrating an example of the insertchild routine 180, as shown in FIG. 3B, operating with the file difference synchronization system 100 (FIGS. 3A and 3B) of the present invention. First at step 181, the insertchild routine is initialized. At step 182, the insertchild routine 180 creates a new node insertchild. At step 183, an insert record is added into the insertchild. At step 184, the insertchild routine 180 determines if the replacement counter is greater than zero. If it is determined at step 184 that the replacement counter is not greater than zero, then the insertchild routine 180 then proceeds to step 186. However, if it is determined at step 184 that the replaced counter is greater than zero, then the insertchild routine 180 adds the replace record to the insertchild using the value of the replace counter at step 185.

At step 186, the insertchild routine 180 makes the insertchild a child of the leaf node on the insert side and advances the original file pointer and the revision file pointer at step 187. At step 188, the insertchild routine 180 increments the replacement counter and then exits at step 189.

It will be apparent to those skilled in the art that many modifications and variations may be made to embodiments of the present invention, as set forth above, without departing substantially from the principles of the present invention. All such modifications and variations are intended to be included herein within the scope of the present invention, as defined in the claims that follow.

What is claimed is:

1. A method for optimizing the creation of a file that represents differences between a plurality of related files, comprising the steps of:
    providing an original file;
    creating a revision file of the original file;
    generating a delta file that identifies only the changes between the original file and the revision file, wherein the delta file is generated using a binary tree to identify the changes between the original file and the revision file, wherein said step of generating a delta file further comprises the steps of:
        generating a insert node in the binary tree for indicating that a mismatch between the data in the original file and the data in the revision file is corrected by inserting new data; and
        generating a delete node in the binary tree for indicating that the mismatch between the data in the original file and the data in the revision file is corrected by deleting indicated data.

2. The method of claim 1, wherein each path in the binary tree represents a correct solution for a delta file to combine with the original file to create the revision file.

3. The method of claim 1, further comprises the step of:
    transmitting the delta file to a device so the device can recreate the revision file using the delta file and a device original file.

4. The method of claim 1, wherein said step of generating the delta file further comprises the steps of:
    comparing each byte of data in the original file with each byte of data in the revision file; and
    generating a node in the binary tree for each way of solving the mismatch between the data in the original file and the data in the revision file.

5. The method of claim 4, wherein the insert node further includes a value indicating a number of byte of data to be skipped before inserting new data in the original file.

6. The method of claim 4, wherein the delete node further includes a second value indicating a number of byte of data to be skipped before deleting the data in the original file.

7. The method of claim 1, wherein said step of generating a delta file further comprises the step of:
    determining a least cost path in the binary tree from among the different ways of solving the mismatch.

8. The method of claim 7, further comprising the step of:
    traversing the binary tree to find the least cost path from a root node to a leaf node;
    pruning a first node of the root node not on the least cost path; and
    accepting a second node as a new root node.

9. A system for optimizing the creation of a file that represents differences between a plurality of related files, comprising:
    a server device containing an original file and a revision file of the original file;
    a delta file that identifies only the changes between the original file and the revision file, wherein the delta file is generated using a binary tree to identify the changes between the original file and the revision file;
    a create insert node module that creates a insert node in the binary tree to indicate that the mismatch between the data in the original file and the data in the revision file is corrected by inserting new data; and
    a create delete node module that creates a delete node in the binary tree to indicate that the mismatch between the data in the original file and the data in the revision file is corrected by deleting indicated data.

10. The system of claim 9, wherein each path in the binary tree represents a correct solution for a delta file to combine with the original file to create the revision file.

11. The system of claim 9, wherein the server device further comprises:
    a transmission module that transmits delta file to a device so the device can recreate the revision file using the delta file and a device original file.

12. The system of claim 9, wherein the client device further comprises:
    a compare module that compares each byte of data in the original file with each byte of data in the revision file; and
    a generation module that generates a node in the binary tree for each way of solving the mismatch between the data in the original file and the data in the revision file.

13. The system of claim 9, wherein the insert node further includes a value indicating a number of byte of data to be skipped before inserting new data in the original file.

14. The system of claim 9, wherein the delete node further includes a second value indicating a number of byte of data to be skipped before deleting the data in the original file.

15. The system of claim 9, wherein the server device further comprises:
    a least cost path module that determines a least cost path in the binary tree from among the different ways of solving the mismatch.

16. The system of claim 15, further comprising:

a traversal module that traverses the binary tree to find the least cost path from a root node to a leaf node, prunes a first node of the root node not on the least cost path, and accepts a second node as a new root node.

17. A computer readable medium for a program code that optimizes the creation of a file that represents differences between a plurality of related files, comprising:

program code for providing an original file;

program code for creating a revision file of the original file;

program code for generating a delta file that identifies only the changes between the original file and the revision file, wherein the delta file is generated using a binary tree to identify the changes between the original file and the revision file, wherein each path in the binary tree represents a correct solutions for a delta file to combine with the original file to create the revision file;

program code for generating a insert node in the binary tree for indicating that the mismatch between the data in the original file and the data in the revision file is corrected by inserting new data; and program code for generating a delete node in the binary tree for indicating that the mismatch between the data in the original file and the data in the revision file is corrected by deleting indicated data.

18. The computer readable medium of claim 17, wherein the program code for generating further comprises:

program code for comparing each byte of data in the original file with each byte of data in the revision file; and program code for generating a node in the binary tree for each way of solving the mismatch between the data in the original file and the data in the revision file.

19. The computer readable medium of claim 17, wherein the delete node further includes a second value indicating an amount of data to be skipped before deleting the data in the original file; and wherein the insert node further includes a value indicating an amount of data to be skipped before inserting new data in the original file.

20. The computer readable medium of claim 19, wherein program code for generating a delta file further comprises:

program code for determining a least cost path in the binary tree from among the different ways of solving the mismatch.

21. The computer readable medium of claim 20, wherein the program code for determining a least cost path further comprises:

program code for traversing the binary tree to find the least cost path from a root node to a leaf node;

program code for pruning a first node of the root node not on the least cost path; and program code for accepting a second node as a new root node.

* * * * *